(12) United States Patent
Lines et al.

(10) Patent No.: US 7,698,535 B2
(45) Date of Patent: Apr. 13, 2010

(54) ASYNCHRONOUS MULTIPLE-ORDER ISSUE SYSTEM ARCHITECTURE

(75) Inventors: Andrew Lines, Calabasas, CA (US); Robert Southworth, Pasadena, CA (US); Uri Cummings, Oak Park, CA (US)

(73) Assignee: Fulcrum Microsystems, Inc., Calabasas, CA (US)

( * ) Notice: Subject to any disclaimer, the term of this patent is extended or adjusted under 35 U.S.C. 154(b) by 739 days.

(21) Appl. No.: 10/667,152

(22) Filed: Sep. 16, 2003

(65) Prior Publication Data

US 2004/0111589 A1 Jun. 10, 2004

Related U.S. Application Data

(60) Provisional application No. 60/411,717, filed on Sep. 16, 2002.

(51) Int. Cl.
*G06F 9/38* (2006.01)
(52) U.S. Cl. ...................................... 712/215
(58) Field of Classification Search ............... 712/23, 712/215
See application file for complete search history.

(56) References Cited

U.S. PATENT DOCUMENTS

| | | | |
|---|---|---|---|
| 4,680,701 A | | 7/1987 | Cochran |
| 4,875,224 A | | 10/1989 | Simpson |
| 4,912,348 A | | 3/1990 | Maki et al. |
| 5,367,638 A | | 11/1994 | Niessen et al. |
| 5,428,811 A | * | 6/1995 | Hinton et al. ............. 712/23 |
| 5,434,520 A | | 7/1995 | Yetter et al. |
| 5,440,182 A | | 8/1995 | Dobbelaere |
| 5,479,107 A | | 12/1995 | Knauer |
| 5,488,729 A | * | 1/1996 | Vegesna et al. ............. 712/209 |
| 5,572,690 A | | 11/1996 | Molnar |
| 5,640,588 A | * | 6/1997 | Vegesna et al. ............. 712/23 |
| 5,666,532 A | | 9/1997 | Saks et al. |
| 5,732,233 A | | 3/1998 | Klim et al. |
| 5,752,070 A | | 5/1998 | Martin et al. |
| 5,802,055 A | | 9/1998 | Krein et al. |
| 5,802,331 A | | 9/1998 | Van Berkel |
| 5,832,303 A | | 11/1998 | Murase et al. |
| 5,884,060 A | * | 3/1999 | Vegesna et al. ............. 712/215 |

(Continued)

FOREIGN PATENT DOCUMENTS

WO    WO9207361    4/1992

OTHER PUBLICATIONS

Bauer, Jerry; Bershteyn, Michael; Kaplan, Ian; and Vyedin, Paul. "A Reconfigurable Logic Machine for Fast Event-Driven Simulation". ACM © 1998.*

(Continued)

*Primary Examiner*—Aimee J Li
(74) *Attorney, Agent, or Firm*—Weaver Austin Villeneuve & Sampson LLP

(57) ABSTRACT

An asynchronous circuit is described for processing units of data having a program order associated therewith. The circuit includes an N-way-issue resource comprising N parallel pipelines. Each pipeline is operable to transmit a subset of the units of data in a first-in-first-out manner. The asynchronous circuit is operable to sequentially control transmission of the units of data in the pipelines such that the program order is maintained.

41 Claims, 5 Drawing Sheets

U.S. PATENT DOCUMENTS

| | | | |
|---|---|---|---|
| 5,889,919 | A | 3/1999 | Inoue et al. |
| 5,918,042 | A | 6/1999 | Furber |
| 5,920,899 | A | 7/1999 | Chu |
| 5,949,259 | A | 9/1999 | Garcia |
| 5,973,512 | A | 10/1999 | Baker |
| 6,038,656 | A * | 3/2000 | Martin et al. ............... 712/211 |
| 6,044,061 | A | 3/2000 | Aybay et al. |
| 6,112,019 | A * | 8/2000 | Chamdani et al. ........... 712/214 |
| 6,152,613 | A | 11/2000 | Martin et al. |
| 6,167,503 | A * | 12/2000 | Jouppi ......................... 712/23 |
| 6,230,228 | B1 | 5/2001 | Eskandari et al. |
| 6,279,065 | B1 | 8/2001 | Chin et al. |
| 6,301,630 | B1 | 10/2001 | Chen et al. |
| 6,301,655 | B1 | 10/2001 | Manohar et al. |
| 6,311,261 | B1 * | 10/2001 | Chamdani et al. ............. 712/23 |
| 6,381,692 | B1 | 4/2002 | Martin et al. |
| 6,502,180 | B1 | 12/2002 | Martin et al. |
| 2003/0140214 | A1 * | 7/2003 | Martin et al. ................. 712/25 |

OTHER PUBLICATIONS

Ahlgren, D.C.; Dunn, J.; and Jagannathan, B. "SiGe Comes of Age in the Semiconductor Industry". Future Fab Intl. vol. 3 © Jul. 8, 2002. http://www.future-fab.com/documents.asp?grID=215&d_ID=1329.*

Krönig, Daniel. "Design and Evaluation of a RISC Porcessor with a Tomasulo Scheduler". © Jan. 1999. Chapter 2: The Scheduling Algorithm.*

Andrew Matthew Lines, *Pipelined Asynchronous Circuits*, Jun. 1995, revised Jun. 1998, pp. 1-37.

Alain J. Martin, *Compiling Communicating Processes into Delay-Insensitive VLSI Circuits*, Dec. 31, 1985, Department of Computer Science California Institute of Technology, Pasadena, California, pp. 1-16.

Alain J. Martin, *Erratum: Synthesis of Asynchronous VLSI Circuits*, Mar. 22, 2000, Department of Computer Science California Institute of Technology, Pasadena, California, pp. 1-143.

U.V. Cummings, et al. *An Asynchronous Pipelined Lattice Structure Filter*, Department of Computer Science California Institute of Technology, Pasadena, California, pp. 1-8.

Alain J. Martin, et al. *The Design of an Asynchronous MIPS R3000 Microprocessor*, Department of Computer Science California Institute of Technology, Pasadena, California, pp. 1-18.

U.S. Appl. No. 09/501,638, filed Feb. 10, 2000, entitled, "Reshuffled Communications Processes in Pipelined Asynchronous Circuits".

Lee et al., "Crossbar-Based Gigabit Packet Switch with an Input-Polling Shared Bus Arbitration Mechanism", Sep. 21, 1997, XVI World Telecom Congress Proceedings, Interactive Session 3—Systems Technology & Engineering, pp. 435-441.

Ghosh et al., "Distributed Control Schemes for Fast Arbitration in Large Crossbar Networks", Mar. 1994, IEEE Transactions on Very Large Scale Integration (VLSI) Systems, vol. 2, No. 1, pp. 55-67.

Venkat et al., "Timing Verification of Dynamic Circuits", May 1, 1995, IEEE 1995 Custom Integrated Circuits Conference.

Wilson, "Fulcrum IC heats asynchronous design debate", Aug. 20, 2002, http://www.fulcrummicro.com/press/article_eeTimes_08-20-02.shtml.

Martin, "Asynchronous Datapaths and the Design of an Asynchronous Adder", Department of Computer Science California Institute of Technology, Pasadena, California, pp. 1-24.

Martin, "Self-Timed FIFO: An Exercise in Compiling Programs into VLSI Circuit", Computer Science Department California Institute of Technology, pp. 1-21.

* cited by examiner

ASYNCHRONOUS MULTIPLE-ORDER ISSUE SYSTEM ARCHITECTURE

RELATED APPLICATION DATA

The present application claims priority from U.S. Provisional Patent Application 60/411,717 for ASYNCHRONOUS MULTIPLE-ORDER ISSUE PROCESSOR ARCHITECTURE filed on Sep. 16, 2002, the entire disclosure of which is incorporated herein by reference for all purposes.

BACKGROUND OF THE INVENTION

The present invention relates to asynchronous system architectures with orders greater than single-issue.

The goal of a dual issue system in a processor architecture is to be able to execute two instructions per cycle. This is accomplished with two parallel pipelines for handling the tasks for each of a pair of instructions. In the standard synchronous design, a pair of instructions are simultaneously received each clock cycle. Because of the interdependency between instructions and the limitation that the instructions be issued simultaneously (i.e., at only one time in each clock cycle), there are inherent system complexities which prevent system performance from approaching the desired goal. That is, when the instructions are issued simultaneously, there are issues relating to program order and data dependency which require complex schemes for determining, for example, whether two instructions may be executed at the same time. These complex schemes not only hamper system performance, but make multiple issue architectures difficult to verify.

It is therefore desirable to provide circuits and techniques by which multiple and mixed-order-issue system architectures may be more readily implemented.

SUMMARY OF THE INVENTION

According to the present invention, an asynchronous system architecture is provided which benefits from the performance advantage of dual and higher-order issue resources without the logical complexity associated with the simultaneous issuance of potentially interdependent data. According to a specific embodiment, an asynchronous circuit is provided for processing units of data having a program order associated therewith. The circuit includes an N-way-issue resource comprising N parallel pipelines. Each pipeline is operable to transmit a subset of the units of data in a first-in-first-out manner. The asynchronous circuit is operable to sequentially control transmission of the units of data in the pipelines such that the program order is maintained. According to a more specific embodiment, an M-way-issue resource is provided along with interface circuitry operable to facilitate communication between the N-way-issue resource and the M-way-issue resource.

According to some embodiments, the interface circuitry is operable to facilitate transmission of selected ones of the data units from the N-way-issue resource to the M-way-issue resource. According to some embodiments, the interface circuitry is operable to facilitate transmission of selected ones of the data units from the M-way-issue resource to the N-way-issue resource. According to some embodiments, the interface circuitry is operable to facilitate transmission of first selected ones of the data units from the N-way-issue resource to the M-way-issue resource, and second selected ones of the data units from the M-way-issue resource to the N-way-issue resource.

According to another embodiment, a heterogeneous system is provided for processing units of data having a program order associated therewith. The system includes an N-way issue resource and at least one multiple-issue resource having an order different from N. The system also includes interface circuitry operable to facilitate communication between the N-way-issue resource and the at least one multiple-issue resource and to preserve the program order in all of the resources. According to a more specific embodiment, the at least one multiple-issue resource comprises a plurality of multiple-issue resources having different orders.

A further understanding of the nature and advantages of the present invention may be realized by reference to the remaining portions of the specification and the drawings.

DETAILED DESCRIPTION OF SPECIFIC EMBODIMENTS

Figure 1:
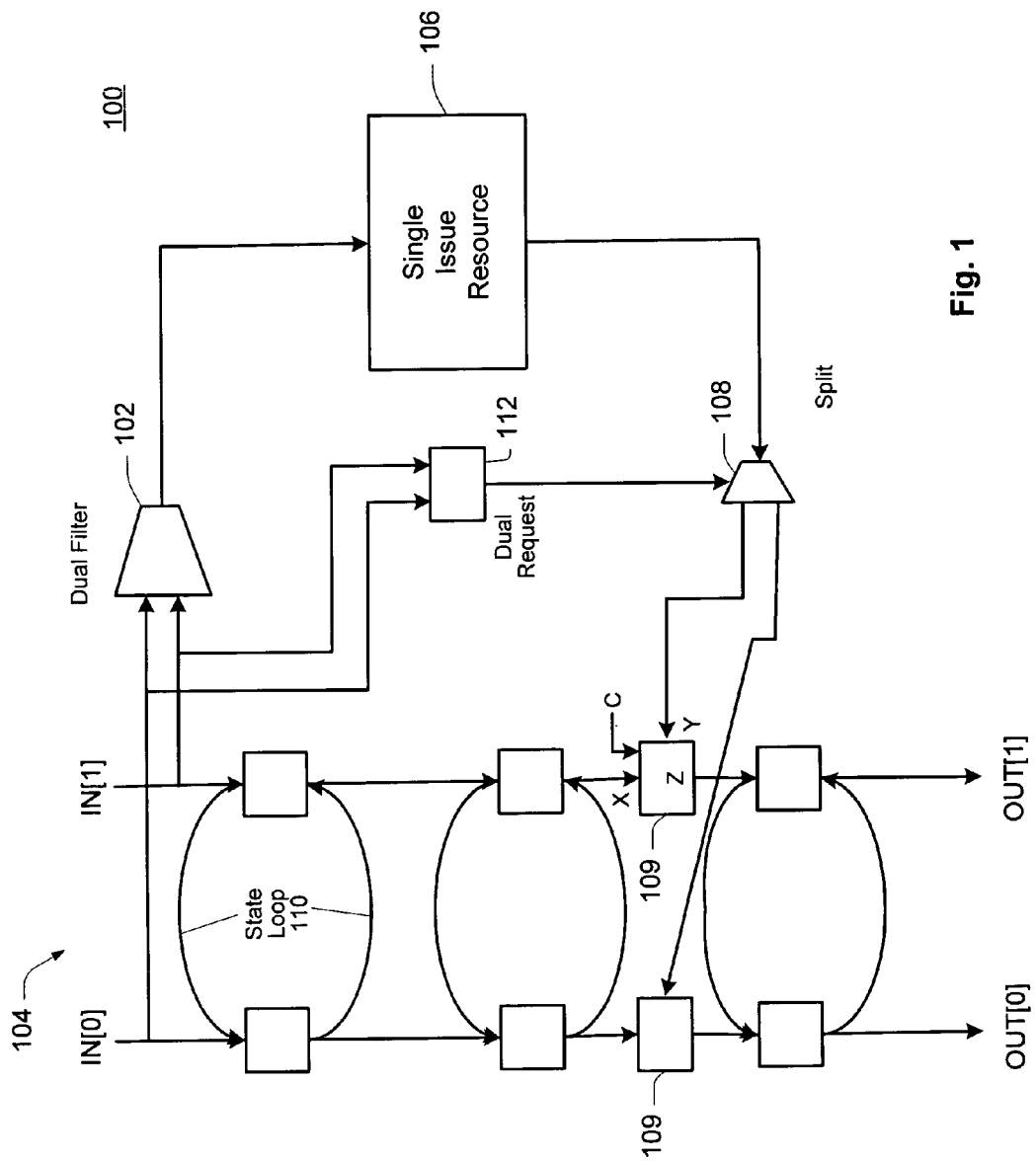
FIG. 1 is a block diagram illustrating a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known features may not have been described in detail to avoid unnecessarily obscuring the invention.

It should also be noted that specific embodiments of the invention may be implemented according to a particular design style relating to quasi-delay-insensitive asynchronous VLSI circuits. However it will be understood that many of the principles and techniques of the invention may be used in other contexts such as, for example, non-delay insensitive asynchronous VLSI as well as synchronous VLSI. As such, the details of the exemplary design style referred to herein or any circuits or systems designed according to such a design style should not be construed as limiting the present invention.

Specific embodiments of the invention will now be described in the context of a particular asynchronous design style which is characterized by the storing of data in channels instead of registers. Such channels implement a FIFO (first-in-first-out) transfer of data from a sending circuit to a receiving circuit. As will become apparent, this automatic queuing of data in these channels is advantageously employed according to the invention.

Data wires run from the sender to the receiver, and an enable (i.e., an inverted sense of an acknowledge) wire goes backward for flow control. A four-phase handshake between neighboring circuits (processes) implements a channel. The four phases are in order: 1) Sender waits for high enable, then sets data valid; 2) Receiver waits for valid data, then lowers enable; 3) Sender waits for low enable, then sets data neutral; and 4) Receiver waits for neutral data, then raises enable. It should be noted that the use of this design style and this handshake protocol is for illustrative purposes and that therefore the scope of the invention should not be so limited.

According to other aspects of this design style, data are encoded using 1 ofN encoding or so-called "one hot encoding." This is a well known convention of selecting one of N+1 states with N wires. The channel is in its neutral state when all the wires are inactive. When the kth wire is active and all others are inactive, the channel is in its kth state. It is an error condition for more than one wire to be active at any given time. For example, in certain embodiments, the encoding of data is dual rail, also called 1 of2. In this encoding, 2 wires (rails) are used to represent 2 valid states and a neutral state. According to other embodiments, larger integers are encoded by more wires, as in a 1 of3 or 1 of4 code. For much larger numbers, multiple 1 ofN's may be used together with different numerical significance. For example, 32 bits can be represented by 32 1 of2 codes or 16 1of4 codes.

According to other aspects of this design style, the design includes a collection of basic leaf cell components organized hierarchically. The leaf cells are the smallest components that operate on the data sent using the above asynchronous handshaking style and are based upon a set of design templates designed to have low latency and high throughput. Examples of such leaf cells are described in detail in "Pipelined Asynchronous Circuits" by A. M. Lines, *Caltech Computer Science Technical Report* CS-TR-95-21, Caltech, 1995, the entire disclosure of which is incorporated herein by reference for all purposes.

In some cases, the above-mentioned asynchronous design style may employ the language CSP (concurrent sequential processes) to describe high-level algorithms and circuit behavior. CSP is typically used in parallel programming software projects and in delay-insensitive VLSI. Applied to hardware processes, CSP is sometimes known as CHP (for Communicating Hardware Processes). For a description of this language, please refer to "Synthesis of Asynchronous VLSI Circuits," by A. J. Martin, DARPA Order number 6202. 1991, the entirety of which is incorporated herein by reference for all purposes.

The transformation of CSP specifications to transistor level implementations for use with various techniques described herein may be achieved according to the techniques described in "Pipelined Asynchronous Circuits" by A. M. Lines, incorporated herein by reference above. However, it should be understood that any of a wide variety of asynchronous design techniques may also be used for this purpose.

The present invention provides an asynchronous multiple-issue architecture in which the issue of instructions in N parallel instruction pipelines are staggered in time, e.g., every half cycle in a dual-issue embodiment, such that N instructions are issued each cycle, but, due to the alternating (and therefore sequential) issuance, the interdependency between closely spaced instructions do not require the complexities or suffer from the resulting underperformance encountered in the typical multiple-issue synchronous system. Embodiments of the present invention take advantage of the "first-in-first-out" nature of asynchronous channels to preserve the logical program order of multiple instructions which are being executed in parallel pipelines.

In some ways, this approach may be conceptualized as a single issue system in which instructions are issued, on average, every 1/N cycles according to the asynchronous flow control. That is, the instruction pipeline hardware itself is N-way-issue, but from the perspective of architectural modeling and verification it may be thought of as a single issue system which reads N alternate instruction channels. However, because instructions are issued every 1/N cycles, when consecutive related instructions are issued, on the micro-architectural level, certain computations may need to be accomplished in 1/N cycles rather than a full cycle.

As will be seen, one of the advantages of this approach is that it allows a heterogeneous system in which an N-way-issue instruction pipeline interacts with different issue resources relatively seamlessly, simply by sequentially selecting the relevant channels. And due to the FIFO nature of the asynchronous channels, conversion back and forth between different order resources may be achieved while maintaining program order. In such a system, specific resources may be implemented according to the particular order architecture which is most suitable for that resource. Thus, for example, many of the architectural simplicities of single-issue resources may be retained in a system which operates with dual or multiple-issue performance.

According to a specific embodiment illustrated in FIG. 1, an asynchronous system 100 includes instances of a dual filter 102 for interfacing a dual issue instruction pipeline 104 with single issue resources (e.g., resource 106), and a "split" circuit 108 and two optional assign circuits 109 for going back from the single issue resource 106 to the dual issue pipeline 104. The parallel instruction pipelines have input channels IN[0] and IN[1], and output channels OUT[0] and OUT[1]. State loops 110 between the two pipelines enable the communication of dependencies between the pipelines. The latency requirement for a state going into and then exiting such a loop is half of a cycle.

During system operation, instructions alternately enter the parallel pipelines at a rate of two per cycle. Each instruction has an associated bit or other implicit information or characteristics which indicates whether the instruction needs to be forwarded on to the single issue resource, i.e., a request for access to the single issue resource. Instructions intended for the single issue resource are forwarded sequentially in the order received by the dual filter to the single issue resource. The output of the single issue resource are then forwarded back to the appropriate pipeline via the split and optional assign circuitry according to control information generated from the instructions themselves by dual request circuitry.

In the embodiment shown, the dual filter requires some mechanism to "filter" or remove data from the dual-issue stream which do not need to go to the single-issue resource. Otherwise, the single-issue resource would present a bottleneck which would detract from the performance of the dual-issue resource. The dual request circuit uses the same control information in a similar manner to facilitate injection of data from the single-issue resource back into the dual-issue stream in way which preserves program order.

The manner in which the N-way to M-way filters are implemented and the filtering decisions are made depends on the types of resources involved. For example, if the asynchronous system being implemented is a processor, the simplicity of the program counter and the manner in which it is normally incremented is such that implementation as a dual-issue resource may be desirable. However, because branching in processors is computationally expensive and is done relatively seldom, e.g., one in seven instructions, it may be desirable to implement the resource which calculates branch addresses as a single-issue resource. In such a case, the dual filter which provides the interface between the program counter and the branch address calculator would look at its copy of the instructions going through the dual-issue stream and remove any instructions which are not branch instructions.

According to a specific embodiment, dual filter 102 has two n-bit asynchronous input channels that correspond to the dual-issue input datapath, IN[0] and IN[1], and two 1-bit asynchronous input channels that together form the dual-issue input control. One n-bit asynchronous output channel is the single-issue output. The input control channel delivers a valid bit for the datapath channel. If the control value is true, then those data are passed to the output single-issue channel. If the control value is false, the data are consumed without being passed on and the single-issue output channel is not exercised. The input "issues" are read alternately.

According to a specific embodiment, dual request 112 has two 1-bit asynchronous input channels that together form the dual-issue input control, and one 1-bit asynchronous output channel that is single issue. The input control channel is a copy of the control channel used in dual filter 102. The output channel contains an ordered single-issue stream that encodes to which issue, e.g. odd or even, the corresponding data token belongs. Dual request 112 works much like dual filter 102 except that, instead of passing a datapath word, it simply notes from which pipeline the datapath word comes. The output of dual request 112 controls a split process 108. Each of the two outputs of split 108 is combined via optional assign circuits 109 with one of the two issues of the dual-issue datapath to facilitate the data re-entering the dual-issue datapath.

According to a specific embodiment, split process or circuit 108 is a 1 to 2 bus which reads a control channel, reads one token of input data from a single channel, then sends the data to one of 2 output channels selected by the value read from the control channel. For additional detail, see "Pipelined Asynchronous Circuits" by A. Lines incorporated by reference above.

According to various embodiments, re-entering into the dual-issue datapath can be accomplished in a number of ways which are computation specific. For example, it may be done with an optional assign (as shown), a merge, or a similar process. An optional assign process is a process with two datapath inputs X and Y, one datapath output Z, and a control input C. If C=0 then data are received on X and sent to Z. If C=1 then data are received on both channels X and Y, the X data are discarded and the Y data are sent to Z. In the pipelines of FIG. 1, two optional assign processes 109 are in the dual issue datapath, with the X input connected to upstream dual-issue pipes, and the Y input connected to the outputs of the split process in the conversion region from single to dual issue. The conversion region may employ copies and optional assigns to reduce the number of pipelines associated with the lower order resource.

According to a specific embodiment, the control input to the optional assigns is a copy of the dual-issue control of the dual-filter. The even control channel controls the even optional assign and the odd control channel controls the odd optional assign. Thus, if a data token did not get filtered out by the dual filter, then a corresponding token must return to the dual-issue datapath, i.e., the corresponding token will appear on channel Y of the optional assign.

According to another embodiment in which a Fetch for a RISC processor is implemented, the data produced by the single issue resource may not be used, i.e., data are filtered once at the dual-filter, and then potentially filtered again at the optional assign. According to this embodiment, additional control information from the dual-issue resource is employed to further filter the data from the single issue resource. According to one embodiment, an enhanced optional assign is provided which allows for a 3rd control state in which X and Y are read, X is passed to Z, and Y is discarded. Such an embodiment is useful, for example, for speculation.

According to a particular implementation, a merge process or circuit for use with the system of FIG. 1 is a 2 to 1 bus which reads a control channel, then reads a token of data from one of the input channels as selected by the value read from the control channel, then sends that data to the single output channel. See "Pipelined Asynchronous Circuits" by A. Lines incorporated by reference above. Merge processes may be used, for example, where there is a one-to-one mapping of data in the pipes of the dual-issue resource to the data in the pipes of the single-issue resource.

Another useful process which may be employed by various embodiments of the invention is a dual repeat process which has one single-issue data input channel, one dual-issue control input channel, and one dual-issue data output channel. In this process the control bit has 2 operations. The first is to send the data to the output issue (same issue number as the control bit), but not operate the input channel so the value is available for future use. The second is to send the data to the output issue (same issue number as the control bit), and remove the data from the input channel, so the next data on the input channel appears on the input when servicing the next issue. According to a specific embodiment, operation 1 must occur most of the time to preserve dual-issue performance.

Using such an interface as shown in FIG. 1, very complex processes which aren't executed all that frequently may be implemented as single issue resources in an otherwise dual issue architecture. If a significant number of system resources may be implemented this way, dual issue performance may be achieved in a circuit having closer to single issue area (and power) requirements. Thus, a microprocessor architecture may be implemented in which only some system resource are implemented as dual issue resources. For example, implementing a branching unit as dual issue can be very complex due, at least in part, to the fact that it necessitates computation of two program counters (PCs) at once. However, using the interface of the present invention allows such a branching unit to be implemented as a single issue resource, the target instruction generated by the branching unit being passed back to a dual issue fetch unit which continues to increment the single PC until there is another branch.

It should be noted that the system and circuits of FIG. 1 are merely exemplary and that many variations of the basic ideas illustrated are within the scope of the invention. That is, for example, the figure and the foregoing description show an implementation in which a dual-issue resource, i.e., the instruction pipeline, utilizes a single-issue resource in such a way that there is a one-to-one correspondence between the data exiting and returning to the dual-issue resource. It will be understood, however, that other implementations are contemplated in which this is not the case. For example, other embodiments may include ones in which data are not returned to the dual-issue resource, or, alternatively, in which the single-issue resource acts as a data source for the dual-issue resource, i.e., providing data to but not receiving data from the dual-issue resource. Additionally data may be returned from the single-issue resource to the dual-issue resource in a more complex manner than one-to-one with the appropriate logic and flow control.

Figure 2:
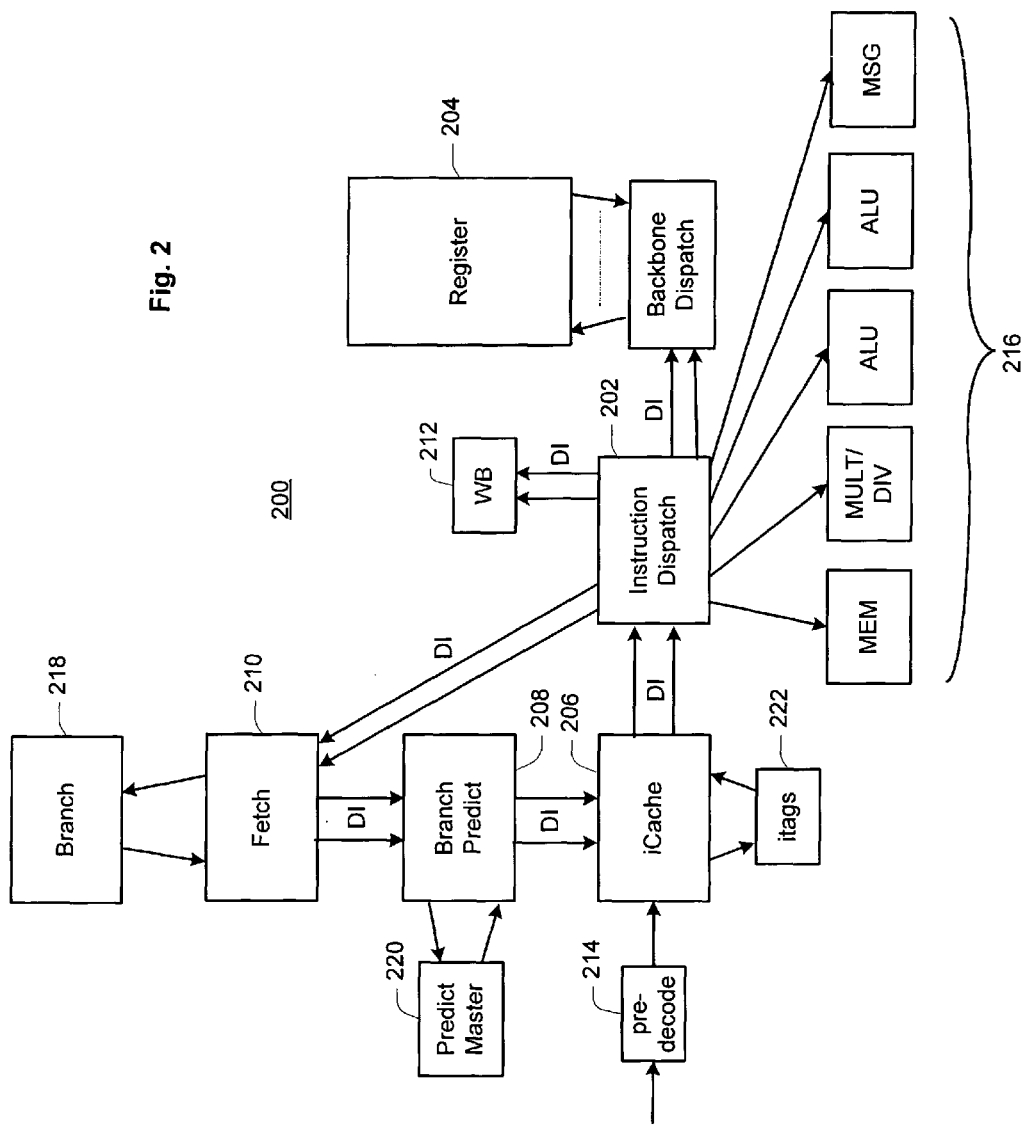
FIG. 2 is a block diagram illustrating a more specific embodiment of the invention.

Referring to FIG. 2, an exemplary processor architecture 200 is provided in which dual issue is used between the instruction dispatch 202 and the register file 204, the icache 206 and the dispatch, the branch predict 208 and the icache, the fetch 210 and the branch predict, the dispatch and the fetch, and the dispatch and the writeback 212. On the other hand, the complicated instruction decoding circuitry 214 going into the icache is single issue. The execution pipelines 216 are single issue. The branch circuitry 218 is single issue.

In addition, certain portions of the system may be implemented partly as single issue and partly as dual issue. For example, the branch predict master block 220 works by loading and executing a straight-line block of instructions beginning with a particular PC, i.e., single issue. It then provides traces to the branch predict block which then unrolls as dual issue. Similarly, the iTags block 222 (which determines whether particular cache lines are in the icache) is implemented as single issue, while the icache is capable of reading two words out of the same cache line, i.e., dual issue.

In general, the interfacing of different issue circuitry enabled by the present invention allows the designer to implement particular circuitry as single or multiple issue depending upon particular design goals/constraints. For example, circuitry having certain complexities which make dual issue design difficult, e.g., state bits, may be implemented as single issue, while more straightforward circuitry may be implemented as dual or higher order issue. Referring back to FIG. 2, the issue order of the overall circuit ranges anywhere from ½ to 6 depending on conditions, so buffering may be added at various points, e.g., between the registers and backbone dispatch, to absorb fluctuations.

Figure 3:
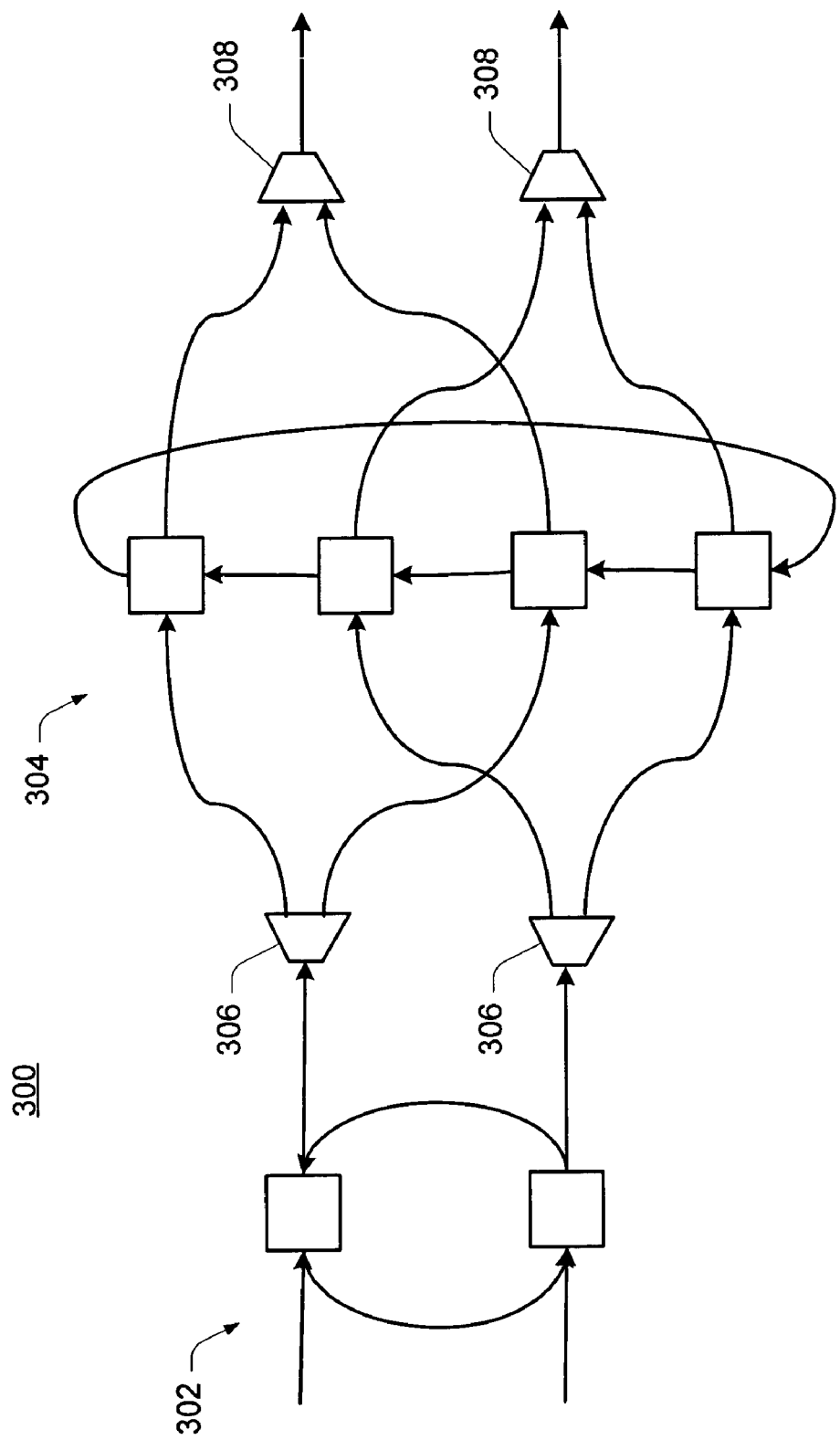
FIG. 3 is a block diagram illustrating yet another embodiment of the invention.

FIG. 3 shows an exemplary implementation of a dual issue to quad issue interface 300 according to a specific embodiment of the invention. The system in FIG. 3 shows a dual-issue resource 302 and a quad-issue resource 304 with a one-to-one mapping of data tokens between the two domains. The even pipe of resource 302 goes to the $0^{th}$ and $2^{nd}$ pipes of resource 304, and then the $0^{th}$ and $2^{nd}$ pipes of resource 304 returns to the even pipe of resource 302. The odd pipe of resource 302 goes the $1^{st}$ and $3^{rd}$ pipes of resource 304, and the $1^{st}$ and $3^{rd}$ pipes of resource 304 returns to the odd pipe of resource 302. This limited communication pattern makes the conversion circuits very simple. That is, according to a specific embodiment of the invention, the conversion circuitry employs alternating splits 306 on the send phase and alternating merges 308 on the return phase. This structure is useful in cases where the pipes associated with resource 304 may experience non-deterministic delay (or deterministic delay which is variable and difficult to design for), and the pipes on average maintain ½ the throughput of the pipes of resource 302. Thus by fanning out to quad-issue and then returning to dual-issue the overall system maintains the performance of the dual-issue pipe.

A practical example of this is in the "writeback" circuit of a standard RISC processor that implements precise exceptions. Precise exceptions are often time consuming to compute, and the writeback circuit can't write the results of the ALUs back into the register file until it knows that that instruction will not cause an exception. In this case the system of FIG. 3 can lead to improved performance.

Figure 4:
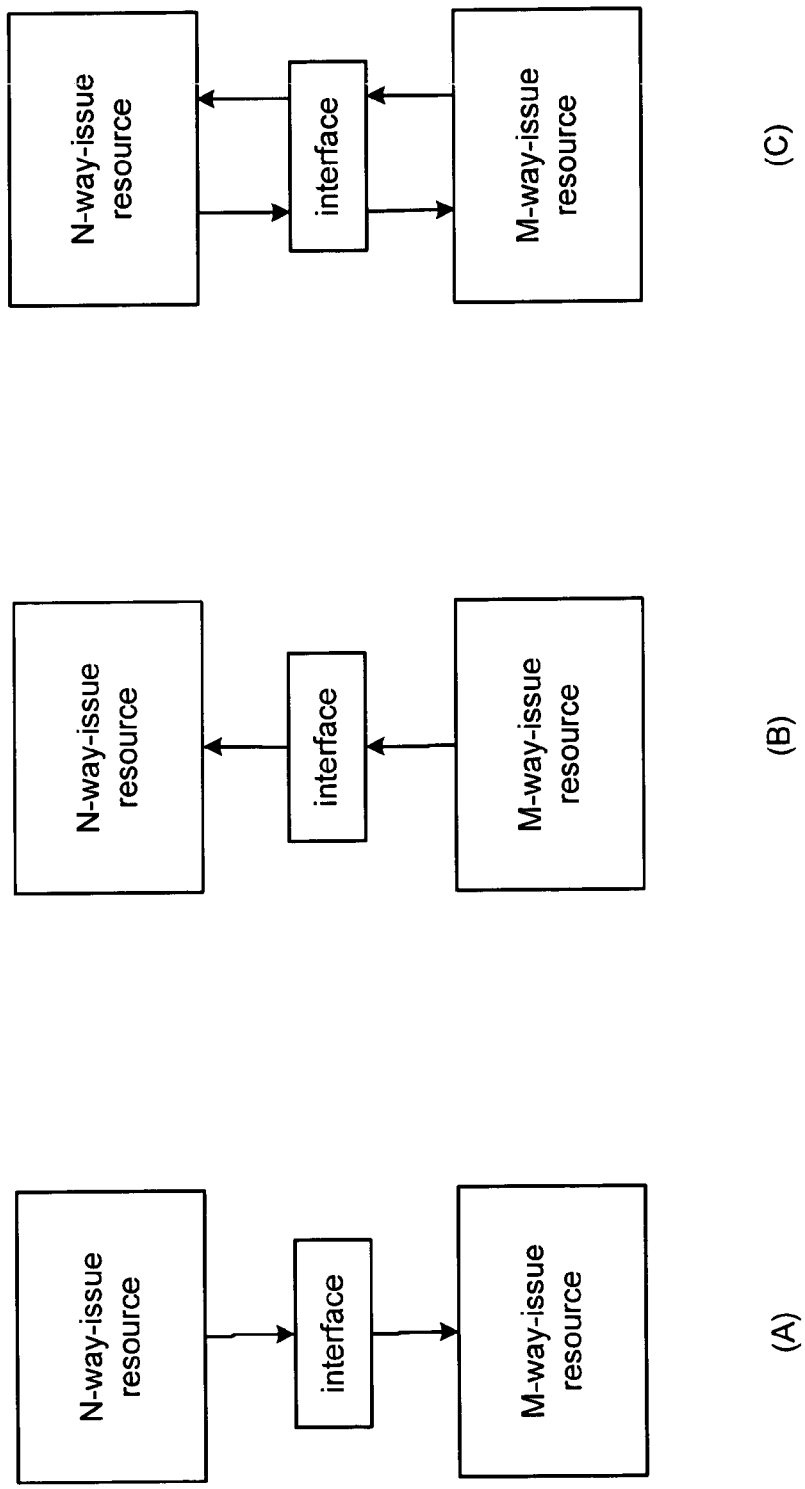
FIGS. 4A-4C are block diagrams illustrating various embodiments of the invention.

To further generalize on the discussion above regarding alternative embodiments, FIGS. 4A-4C show some generalized embodiments in which N-way-issue and M-way-issue resources interact in different ways. For example, FIG. 4A represents embodiments in which data are not returned to the resource from which they were received. Alternatively, FIG. 4B represents embodiments in which one resource acts as a data source for another. Finally, FIG. 4C represents embodiments in which data are both received from and returned to the originating resource. As discussed above, in embodiments corresponding to FIG. 4C, data may be received from and then returned to the originating resource in a more complex manner than a one-to-one correspondence with the appropriate logic and flow control.

Figure 5:
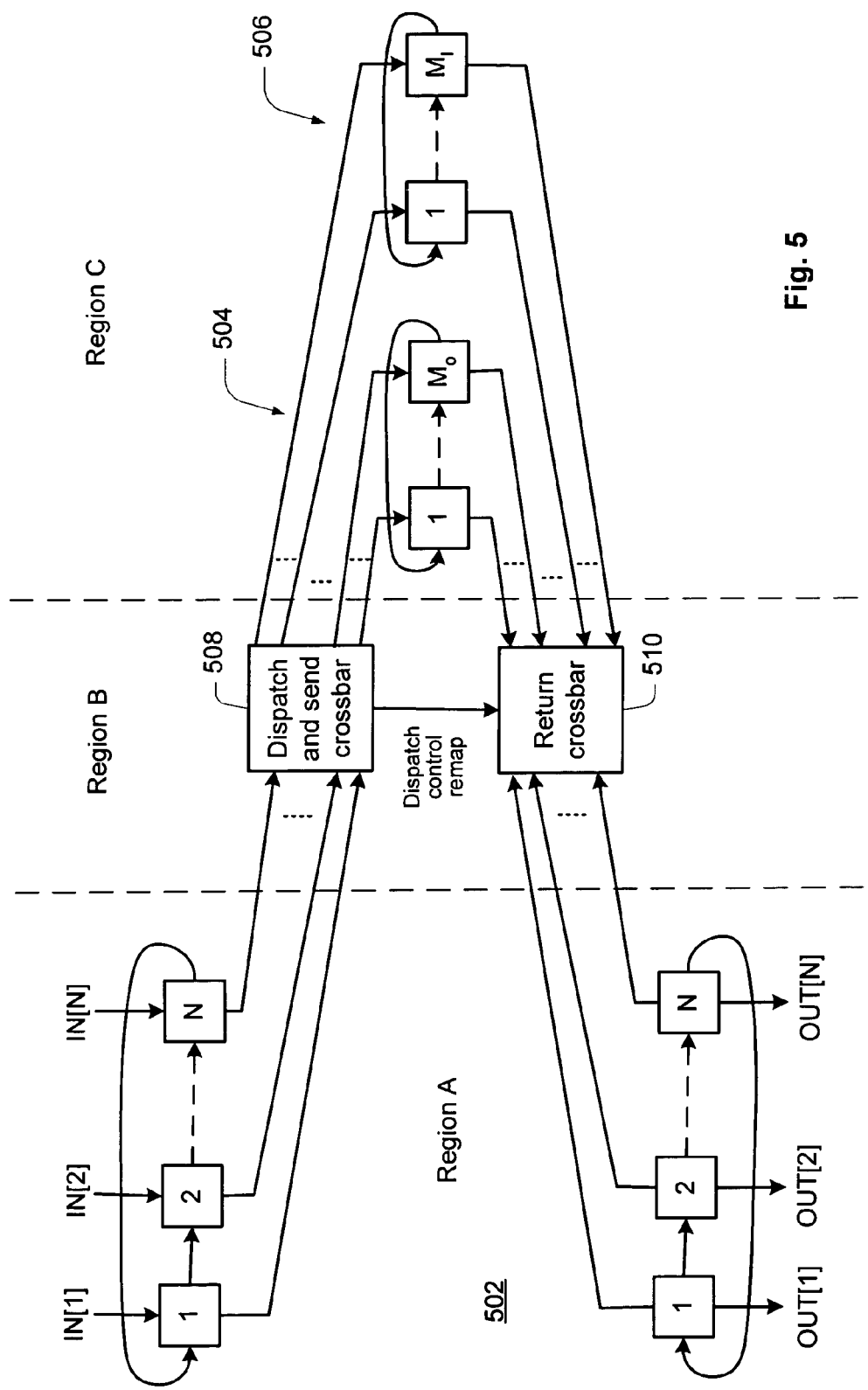
FIG. 5 is an exemplary representation of more general embodiment of the invention.

FIG. 5 is an exemplary representation of more general embodiment of the invention. The system is divided into regions A, B, C. Region A contains a single multi-issue resource 502. Region C contains separate resources 504 and 506 that may be single or multi-issue. Region B contains circuitry 508 and 510 to facilitate the communication of data from the multi-issue resource in region A, to the resources in region C, and then to facilitate the communication of data from region C back to A, such that program order is maintained in both regions A and C. For the purposes of this disclosure, a pipe is defined as the single-issue component of which N in parallel, linked together by state processes flowing through neighboring pipes in sequence, constitute an N-way issue resource. Each pipe processes data in FIFO order. For example, if region A comprises one quad-issue resource, it has four pipes; and if region C comprises two dual-issue resources and one single issue resource, it has 5 pipes.

Consider the case where there is a one-to-one mapping of data tokens in the pipes in region A with data tokens in the pipes in region C for both communication going from A to C as well as the return path of C to A. In this case, an appropriate routing solution from region A to region C is a dispatch circuit. Generally speaking, a dispatch circuit is a circuit which is operable to route the data units received on a first number of input channels to designated ones of a second number of output channels in a deterministic manner thereby preserving a partial ordering for each output channel defined by a program order. In the context of the present invention, such a dispatch may be employed to connect an N-way issue resource to potentially multiple multi-issue resources such that ordering is preserved in each direction. An exemplary implementation of a dispatch circuit is described in U.S. Patent Publication No. US-2003-0146073-A1 for ASYNCHRONOUS CROSSBAR WITH DETERMINISTIC OR ARBITRATED CONTROL filed on Apr. 30, 2002, the entire disclosure of which is incorporated herein by reference for all purposes. It will be understood that a variety of mechanisms may be used for this function within the scope of the invention.

Dispatch circuit 508 services the transfer of data of pipes in region A in order to the next available pipe in order out of all of the resources in region C. The routing decisions of dispatch circuit 508 are preserved and sent to return crossbar 510 that connects the pipes of region C back to the pipes of region A for the return path. For each region A pipe, the routing information identifying to which pipe in region C it's data was sent is the "merge control" of the return crossbar. The routing information of region C pipes identifying which region A pipe from which data are received is the "split control" of the return crossbar. As with the dispatch circuit, a crossbar for use with the present invention is described in U.S. Patent Publication No. US-2003-0146073-A1 incorporated herein by reference above.

As will be understood, there are many optimizations that can be made to the more general embodiment of FIG. 5 for particular applications. For example, the system of FIG. 1, a system that employs a dual-filter, dual-request, 1×2 split, and 2 2×1 optional assigns (or merges) is one such optimization. The system of FIG. 3, a system that employs alternating splits and alternating merges is another such optimization.

Another optimization is possible when the pipes in region C are fewer than the pipes in region A, e.g., because there is a low duty cycle requirement in region C. That is, not every piece of data needs to be processed in region C. In such a case, all of the data of region A is copied from the forward mapping to C, and used in the reverse mapping back to A. When data are computed in region C, it replaces the copy of this data during the reverse mapping back to region A. An optional assign (described above) may be used to do this.

While the invention has been particularly shown and described with reference to specific embodiments thereof, it will be understood by those skilled in the art that changes in the form and details of the disclosed embodiments may be made without departing from the spirit or scope of the invention. For example, the circuits and systems described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., processors, programmable logic devices, etc.) suitable for using in conjunction with the embodiments described herein are within the scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An asynchronous circuit for processing units of data having a program order associated therewith, the asynchronous circuit being configured to employ asynchronous flow control to facilitate transmission of the data units, the asynchronous flow control being characterized by an average cycle time, the circuit comprising an N-way-issue resource comprising N parallel pipelines, each pipeline being operable to transmit a subset of the units of data in a first-in-first-out manner, wherein the data units are issued to the respective pipelines staggered in time such that up to N data units enter the N pipelines during the average cycle time, wherein the asynchronous circuit is operable to sequentially control transmission of the units of data in the pipelines such that the program order is maintained.

2. The circuit of claim 1 wherein the circuit comprises a processor and wherein the N-way-issue resource comprises an instruction pipeline.

3. The circuit of claim 1 wherein N comprises an integer greater than 1.

4. The circuit of claim 1 further comprising an M-way-issue resource, and interface circuitry operable to facilitate communication between the N-way-issue resource and the M-way-issue resource.

5. The circuit of claim 4 wherein M is fewer than N.

6. The circuit of claim 5 wherein M is 1 and N is 2.

7. The circuit of claim 4 wherein M is greater than N.

8. The circuit of claim 7 wherein M is 4 and N is 2.

9. The circuit of claim 4 wherein the interface circuitry is operable to facilitate transmission of selected ones of the data units from the N-way-issue resource to the M-way-issue resource.

10. The circuit of claim 4 wherein the interface circuitry is operable to facilitate transmission of selected ones of the data units from the M-way-issue resource to the N-way-issue resource.

11. The circuit of claim 4 wherein the interface circuitry is operable to facilitate transmission of first selected ones of the data units from the N-way-issue resource to to M-way-issue resource, and second selected ones of the data units from the M-way-issue resource to the N-way-issue resource.

12. The circuit of claim 11 wherein there is a one-to-one correspondence between the first and second selected data units.

13. The circuit of claim 11 wherein there is not a one-to-one correspondence between the first and second selected data units.

14. The circuit of claim 4 wherein the asynchronous circuit comprises a processor and wherein each of the N-way-issue resource and the M-way-issue resource comprises one of an instruction dispatcher, a register file, an instruction cache, a branch predictor, an instruction fetch circuit, a writeback circuit, an instruction decoding circuit, an execution pipeline, and branch circuitry.

15. The circuit of claim 4 wherein the interface circuitry is operable to identify selected ones of the data units in a higher order one of the resources for transmission to a lower order one of the resources.

16. The circuit of claim 4 wherein the interface circuitry is operable to transmit selected ones of the data units generated by a lower order issue one of the resources to a higher order issue one of the resources in such a way as to facilitate preservation of the program order.

17. The circuit of claim 1 wherein each pipeline is operable to transmit the units of data in accordance with an asynchronous handshake protocol.

18. The circuit of claim 17 wherein the asynchronous handshake protocol between a sender and a receiver in each of the pipelines comprises:
   the sender sets a data signal valid when an enable signal from the receiver goes high;
   the receiver lowers the enable signal upon receiving the valid data signal;
   the sender sets the data signal neutral upon receiving the low enable signal; and
   the receiver raises the enable signal upon receiving the neutral data signal.

19. The circuit of claim 18 wherein the handshake protocol is delay-insensitive.

20. The asynchronous circuit of claim 1 wherein each pipeline comprises a plurality of stages, corresponding stages in each pipeline being interconnected in a state loop operable to communicate state information among the pipeline stages.

21. The circuit of claim 1 wherein the asynchronous circuit comprises any of a CMOS integrated circuit, a GaAs integrated circuit, and a SiGe integrated circuit.

22. At least one computer-readable medium having data structures stored therein representative of an asynchronous circuit for processing units of data having a program order associated therewith, the asynchronous circuit being configured to employ asynchronous flow control to facilitate transmission of the data units, the asynchronous flow control being characterized by an average cycle time, the circuit comprising an N-way-issue resource comprising N parallel pipelines, each pipeline being operable to transmit a subset of the units of data in a first-in-first-out manner, wherein the data units are issued to the respective pipelines staggered in time such that up to N data units enter the N pipelines during the average cycle time, wherein the asynchronous circuit is operable to sequentially control transmission of the units of data in the pipelines such that the program order is maintained.

23. A set of semiconductor processing masks representative of an asynchronous circuit for processing units of data having a program order associated therewith, the asynchronous circuit being configured to employ asynchronous flow control to facilitate transmission of the data units, the asynchronous flow control being characterized by an average cycle time, the circuit comprising an N-way-issue resource comprising N parallel pipelines, each pipeline being operable to transmit a subset of the units of data in a first-in-first-out manner, wherein the data units are issued to the respective pipelines staggered in time such that up to N data units enter the N pipelines during the average cycle time, wherein the asynchronous circuit is operable to sequentially control transmission of the units of data in the pipelines such that the program order is maintained.

24. A heterogeneous system for processing units of data having a program order associated therewith, the system comprising an N-way issue resource and at least one multiple-issue resource having an order different from N, the N-way issue resource being configured to employ asynchronous flow control to facilitate transmission of the data units, the asynchronous flow control being characterized by an average cycle time, the N-way issue resource being configured such that the units of data are issued to N parallel pipelines staggered in time such that up to N data units enter the N pipelines during the average cycle time, the system further comprising interface circuitry operable to facilitate communication between the N-way-issue resource and the at least one multiple-issue resource and to preserve the program order in all of the resources.

25. The system of claim 24 wherein the at least one multiple-issue resource comprises a plurality of multiple-issue resources having different orders.

26. The system of claim 24 wherein the interface circuitry comprises a dispatch circuit operable to route the data units received from the N-way issue resource on a first number of input channels to designated ones of a second number of output channels associated with the at least one multiple-issue resource in a deterministic manner thereby preserving a partial ordering for each output channel defined by the program order.

27. The system of claim 24 wherein the N-way issue resource comprises first and second pipelines, and the interface circuitry comprises a dual filter comprising a dual-issue input datapath corresponding to the first and second pipelines, a single-issue output datapath, and a control channel, the dual filter being operable to selectively transmit data tokens on the input datapath to the output datapath according to control information on the control channel.

28. The system of claim 24 wherein the interface circuitry comprises remapping circuitry operable to route the data units received from the at least one multiple-issue resource on a first number of input channels to designated ones of a second number of output channels associated with the N-way issue resource in a manner which preserves the program order.

29. The system of claim 28 wherein the remapping circuitry comprises a crossbar circuit which is controlled by routing information generated when the data units are transmitted from the N-way issue resource to the at least one multiple-issue resource.

30. The system of claim 24 wherein the at least one multiple-issue resource comprises an M-way issue resource where M is an integer multiple of N, and wherein the interface circuitry comprises a plurality of split circuits which operate alternately to transmit the data units from the N-way issue resource to the M-way issue resource, and a plurality of merge circuits which operate alternately to transmit the data units from the M-way issue resource to the N-way issue resource.

31. The system of claim 24 wherein the at least one multiple-issue resource comprises an M-way issue resource where M is less than N, and wherein the interface circuitry comprises at least one optional assign circuit which is operable to receive the data units from both of the N-way issue resource and M-way issue resource and to selectively transmit the received data units back into the N-way issue resource, thereby mitigating effects of a difference in throughput between the N-way issue resource and the M-way issue resource.

32. The system of claim 31 wherein the interface circuitry further comprises a crossbar circuit by which the data units are transmitted from the M-way issue resource to the at least one optional assign circuit.

33. The system of claim 31 wherein the at least one optional assign comprises first and second input datapaths, an output datapath, and a control input, the at least one optional assign being operable to transmit a first data token on the first input datapath to the output datapath when the control input is in a first state, the at least one optional assign further being operable to discard the first data token and to transmit a second data token on the second input datapath to the output datapath when the control input is in a second state.

34. The system of claim 33 wherein the at least one optional assign further being operable to discard the second data token and to transmit the first data token to the output datapath when the control input is in a third state.

35. The system of claim 24 wherein the interface circuitry comprises a dual repeat circuit comprising a single-issue data input channel, a dual-issue data output channel, and a control channel, the dual repeat circuit being operable in response to control information on the control channel to transmit a first data token on the input channel to the output channel and to maintain the first data token on the input channel for future use, the dual repeat circuit also being operable in response to the control information to transmit a second data token on the input channel to the output channel and to discard the second data token so that the input channel can receive subsequent data token.

36. The system of claim 24 wherein the N-way issue resource has N pipelines associated therewith, and wherein the at least one multiple-issue resource has P pipelines associated therewith, and wherein N may be any of fewer than P, equal to P, or greater than P.

37. The system of claim 24 wherein there is a one-to-one correspondence between the data units in the N-way issue resource and the data units in the at least one multiple-issue resource.

38. The system of claim 24 wherein, at any given time, more of the data units are in the N-way issue resource than the at least one multiple-issue resource.

39. The system of claim 24 wherein the system comprises any of a CMOS integrated circuit, a GaAs integrated circuit and a SiGe integrated circuit.

40. At least one computer-readable medium having data structures stored therein representative of a heterogeneous system for processing units of data having a program order associated therewith, the system comprising an N-way issue resource and at least one multiple-issue resource having an order different from N, the N-way issue resource being configured to employ asynchronous flow control to facilitate transmission of the data units, the asynchronous flow control being characterized by an average cycle time, the N-way issue resource being configured such that the units of data are issued to N parallel pipelines staggered in time such that up to N data units enter the N pipelines during the average cycle time, the system further comprising interface circuitry operable to facilitate communication between the N-way-issue resource and the at least one multiple-issue resource and to preserve the program order in all of the resources.

41. A set of semiconductor processing masks representative of a heterogeneous system for processing units of data having a program order associated therewith, the system comprising an N-way issue resource and at least one multiple-issue resource having an order different from N, the N-way issue resource being configured to employ asynchronous flow control to facilitate transmission of the data units, the asynchronous flow control being characterized by an avenge cycle time, the N-way issue resource being configured such that the units of data are issued to N parallel pipelines staggered in time such that up to N data units enter the N pipelines during the average cycle time, the system further comprising interface circuitry operable to facilitate communication between the N-way-issue resource and the at least one multiple-issue resource and to preserve the program order in all of the resources.

* * * * *